No. 756,964. PATENTED APR. 12, 1904.
S. HUGHES.
PULVERIZING MACHINE.
APPLICATION FILED JULY 11, 1902.
NO MODEL. 3 SHEETS—SHEET 2.
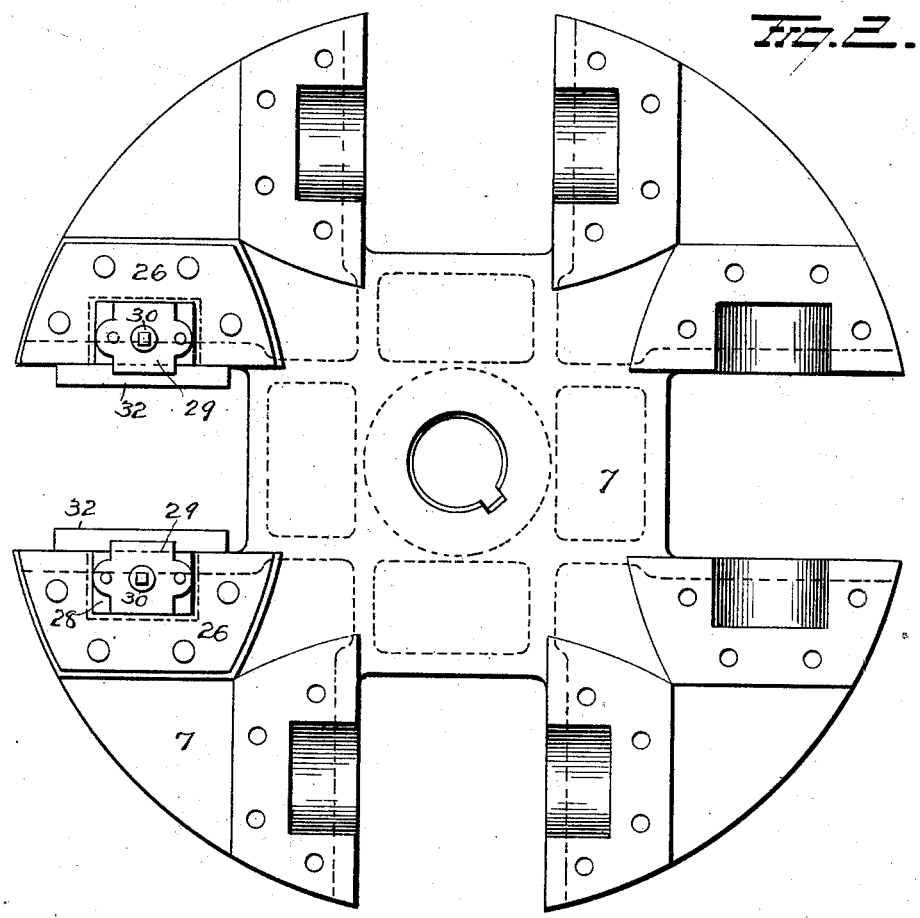
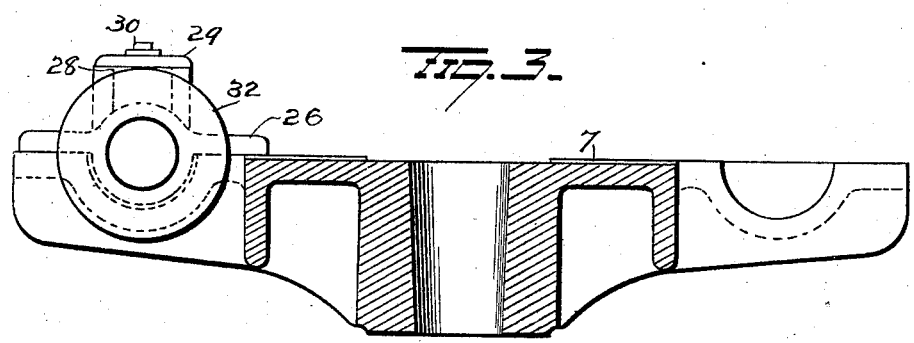

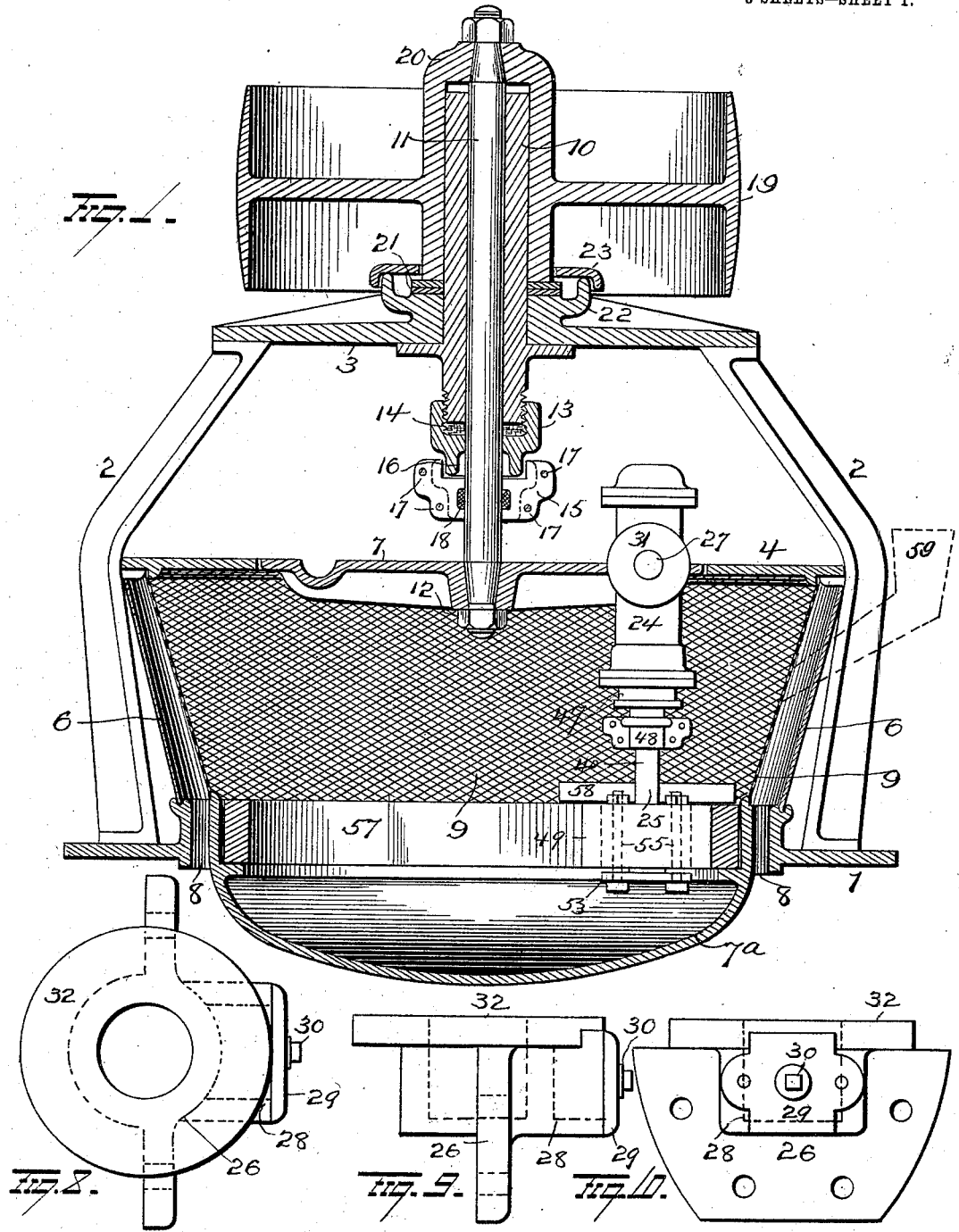

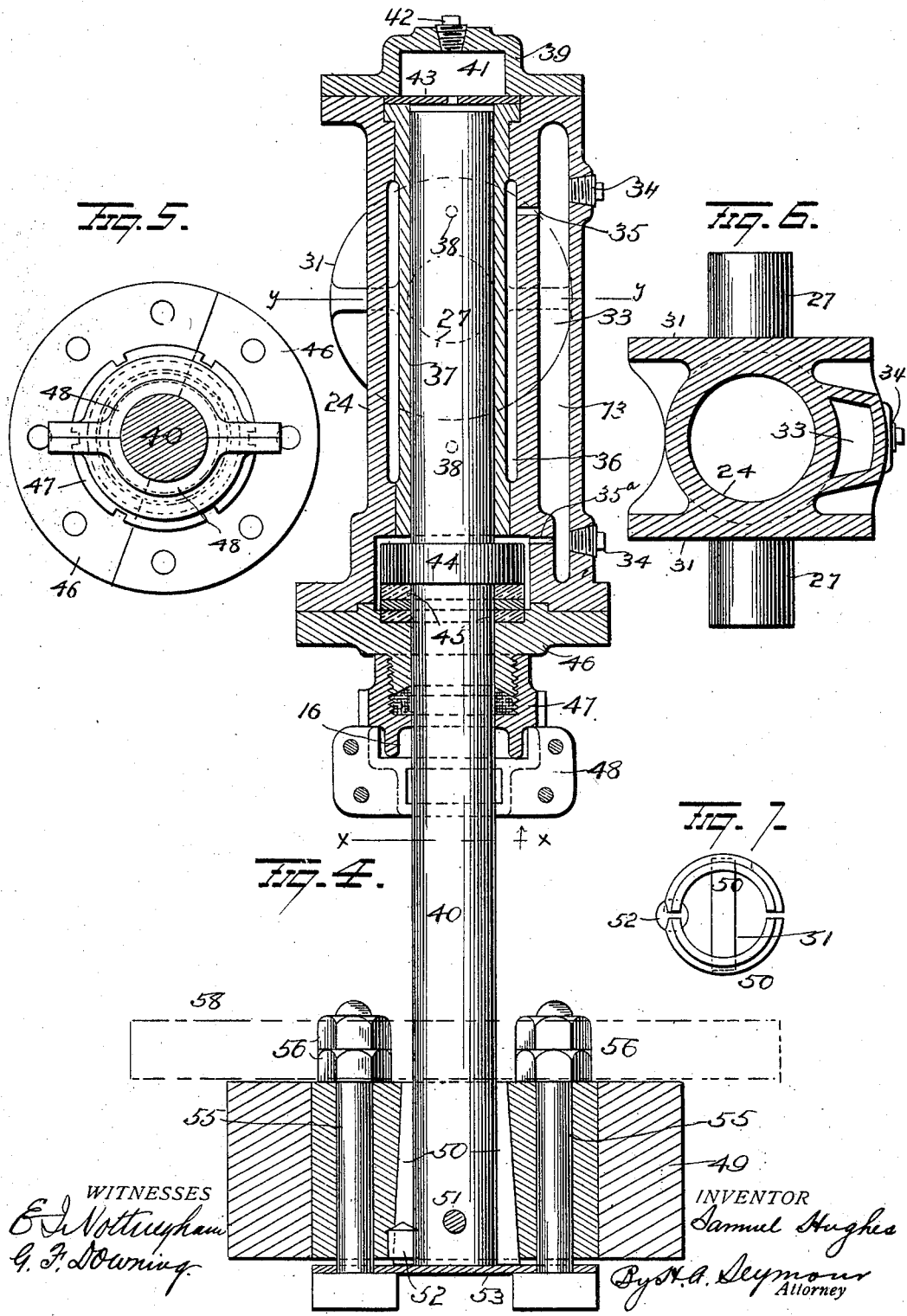

No. 756,964.

Patented April 12, 1904.

UNITED STATES PATENT OFFICE.

SAMUEL HUGHES, OF SUMMERVILLE, SOUTH CAROLINA.

PULVERIZING-MACHINE.

SPECIFICATION forming part of Letters Patent No. 756,964, dated April 12, 1904.

Application filed July 11, 1902. Serial No. 115,158. (No model.)

*To all whom it may concern:*

Be it known that I, SAMUEL HUGHES, a resident of Summerville, in the county of Dorchester and State of South Carolina, have invented certain new and useful Improvements in Pulverizing-Machines; and I do hereby declare the following to be a full, clear, and exact description of the invention, such as will enable others skilled in the art to which it appertains to make and use the same.

My invention relates to an improved pulverizing-machine, the object of the invention being to provide a machine of this character with firm bearings to compel the parts to run true and so construct and pack the bearings to prevent possibility of the entrance of dust therein to interfere with the perfect operation thereof.

A further object is to provide the various bearings with improved lubricant-chambers maintaining a supply of lubricant for the bearings.

A further object is to provide a machine of this character which will by the expenditure of a minimum of power perfectly carry out its pulverizing operation and so shape the screen and receptacle to assist the dust in escaping.

With these objects in view the invention consists in certain novel features of construction and combinations and arrangements of parts, as will be more fully hereinafter described, and pointed out in the claims.

In the accompanying drawings, Figure 1 is a vertical cross-section of a pulverizing-machine embodying my improvements. Fig. 2 is an enlarged plan view of the driving-disk. Fig. 3 is a view in cross-section of said disk. Fig. 4 is an enlarged longitudinal sectional view showing one of the crushing-rolls, the shaft therefor, and the bearings for said shaft, the shaft being shown in elevation. Fig. 5 is a cross-sectional view on the line $x$ $x$ of Fig. 4 in the direction of the arrow. Fig. 6 is a cross-sectional view on the line $y$ $y$ of Fig. 4 with the shaft removed. Fig. 7 is a detail view showing the bushing 50, pin 51, and dowel 52. Fig. 8 is a side view of one of the trunnion-bearings turned at right angles to its normal position. Fig. 9 is an end view of said bearing when in the position shown in Fig. 8, and Fig. 10 is a plan view of said bearing.

1 represents the bed-plate of the machine supporting bowed standards 2, having secured on their upper ends a plate 3. At the bowed portions of standards 2 a horizontal ring 4 is located and in which the driving-disk 7 revolves. This ring 4 is supported upon the upper edge of an inverted truncated conical casing 6, which latter is secured to and supported upon bed-plate 1, and in said casing, at its lower end, a pan $7^a$ is supported and spaced from the casing, as shown at 8, to provide an outlet for the pulverized material after it has passed through a screen 9, secured at its ends to ring 4 and pan $7^a$ and of the same general shape as casing 6.

Through the center of top plate 3 a tubular bearing or sleeve 10 projects, is flanged near its lower end and bears against the bottom of plate 3, and is adapted to receive the drive-shaft 11, made tapering or conical at its ends and secured at its lower end in a central tapering boss in the driving-disk 7 by means of a nut 12, screwed onto the end of the shaft, and the shaft and boss are keyed together, as shown, to compel the turning of the disk when the shaft is revolved.

To prevent entrance of dust to the bearing, I screw onto the threaded lower end of tubular bearing or sleeve 10 a gland 13, in which a suitable packing 14 is located around the shaft in the gland and against the lower end of sleeve 10. The lower end of this gland is made inverted-cup shape and extends into a socket formed in the upper end of a split packing-ring 15 to form a lubricant drip-chamber 16 and catch lubricant which runs down the shaft and hold the lubricant in position to be supplied to the shaft. This packing-ring 15 is made in two sections, flanged at their edges, and secured by screws or rivets 17, and said ring is made with an internal pocket to receive and clamp a rubber or other ring 18 upon the shaft and make an absolutely-tight fit to prevent the entrance of dust to the bearing and the loss of lubricant therefrom.

On the upper end of shaft 11 the driving-pulley 19 is secured, the conical end of the shaft extending through the closed upper end of the elongated hub 20 of the pulley and secured therein by a nut, as shown. The hub 20 turns on the tubular bearing 10, and the lower end of the hub is supported on rings or washers 21, located in a pocket 22 integral with plate 3 and closed by a cap 23. The cup serves also to contain a supply of lubricant for the pulley.

The driving-disk 7 is made with four diametrically opposite recesses or openings to receive the cylinders 24 for the roll-shafts 40. On opposite sides of the recesses or openings the disk is made with semicircular depressions to receive trunnion-bearings 26, secured to the disk by screws or rivets, as shown, and supporting the trunnions 27 of cylinders 24, and these trunnion-bearings are made with lubricant-chambers 28, closed by plates 29, having plugs 30 to permit the entrance of lubricant into the chambers and close the same. The cylinder 24 or the trunnions 27 thereon and the trunnion-bearings 26 are made with circular bearing disks or flanges 31 and 32, respectively, to move against each other and absolutely prevent any lateral movement of the cylinder, but not interfere with the pivotal movement of the cylinders in one direction, as will hereinafter appear. The location and shape of these bearing disks or flanges 31 and 32 may be changed at will without departing from my invention, and hence I do not wish to be limited to their precise construction and location set forth, as they may be angular and may be located to one side of the trunnions and perform the same functions above described.

All of the roll-shaft cylinders are constructed precisely alike, and hence the hereinafter-detailed description of one applies alike to all.

The cylinder 24 is provided on one side with a lubricant-chamber 33, having plugged inlets 34 and connected by ducts 35 with an annular chamber 36, cored in the cylinder around a central sleeve 37, which latter is also provided with ducts 38 to admit the lubricant to the roll-shaft 40, mounted in the sleeve, said sleeve being preferably flanged at its upper end to fit an annular seat in the top of the cylinder. A cap 39 is secured on the top of the cylinder and made with a lubricant-chamber 41, having a plugged inlet 42 and separated from the roll-shaft by a perforated disk 43, through which the lubricant passes to the end of the shaft. The lower end of the cylinder is cored to receive an annular shoulder 44 on shaft 40, and a suitable packing 45 is provided around the shaft between the shoulder 44 and a tubular cap 46, closing the lower end of the cylinder. On this cap 46 a gland 47 is secured, and a split packing-ring 48 is secured around the shaft and over the end of the gland, the construction and operation of this gland 47 and packing 48 being precisely like gland 13 and packing 15 above described in detail.

On the lower ends of shafts 40 the rolls 49 are secured by means of split tapered bushings 50, secured to the shaft by a cross-pin 51 and a dowel-pin 52, and plates 53 project across the lower ends of the bushing to hold the latter in place, and bolts 55 are passed up through the plates and rolls and secured in place by means of nuts 56, the headed lower ends of said bolts serving as stirrers to agitate the material in pan 6. The rolls 49 are turned by their contact with wearing-ring 57 in pan 7ª to crush the stone or other material, and as the dust has a tendency to accumulate on this ring 57 I provide flexible stirrers 58 on roll-shafts 40 to scrape the dust from the wearing-ring and force it through the screen or back into the pan.

The operation of my improvements is as follows: The material to be pulverized is fed into the machine by a suitable hopper 59, located as shown or at any other point desired, and the material falls into pan 7ª. The disk 7, carrying cylinders 24, is turned by drive-shaft 11, as above explained, and as the rolls are moved against wearing-ring 57 they are turned and crush the material between the rolls and ring, the dust or pulverized material escaping through the screen and out through the passage formed between pan 6 and the casing, and it will be seen that by making the screen of an inverted conical shape the dust which falls thereagainst will pass through and not fall back into the pan, as would be the case were the screen straight or inclined inward.

It will be seen that with my improvements the bearings are all most effectually protected from dust and are continuously supplied with lubricant, and owing to the firm bearings the shafts cannot get out of plumb to increase wear and strain on the parts, and a machine is hence produced which is a vast improvement over all others heretofore known.

A great many slight changes might be made in the general form and arrangement of parts described without departing from my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. In a pulverizing-machine, the combination with a shaft, and a bearing therefor, of a gland on said bearing, packing in the gland, a cup under the bottom of said gland, a split packing-ring secured on the shaft and closing the cup and an elastic packing in said ring.

2. In a pulverizing-machine, the combination with a shaft and a bearing therefor, of a gland on said bearing having a chambered bottom, a split packing-ring closing the chambered bottom of the gland, and lubricant-chambers around and at the top of said bearing.

3. In a pulverizing-machine, the combination with a roll-shaft, of a roll, a split conical bushing on the shaft in the roll, a pin passed through the bushing and shaft, a dowel-pin in said bushing, a plate beneath the roll and bushing, and headed bolts passed through said plate and roll and secured in place by nuts, the heads of said bolts serving as stirrers for the machine.

4. In a pulverizing-machine, the combination with a roll-shaft and a roll, of a vertical bearing for the shaft, provided at its lower end with a gland, and a split ring provided with a drip-chamber, secured to the shaft and receiving the lower end of said gland.

In testimony whereof I have signed this specification in the presence of two subscribing witnesses.

SAMUEL HUGHES.

Witnesses:
L. R. FITZSIMONS,
R. M. McDERMID.